United States Patent [19]

Smyth

[11] Patent Number: 4,523,667

[45] Date of Patent: Jun. 18, 1985

[54] THROTTLE MODULATION MECHANISM

[75] Inventor: Robert R. Smyth, Bloomfield Hills, Mich.

[73] Assignee: Eaton Corporation, Cleveland, Ohio

[21] Appl. No.: 453,544

[22] Filed: Dec. 27, 1982

[51] Int. Cl.[3] ........................ F16D 23/00; F16D 47/00

[52] U.S. Cl. ................................ 192/0.092; 192/0.084

[58] Field of Search ......................... 74/474, 858, 860; 192/0.08, 0.084, 0.092

[56] References Cited

U.S. PATENT DOCUMENTS 2,286,193 6/1942 Bennetch .......................... 192/0.092
2,551,287 5/1951 Price ............................ 192/0.084 X
2,572,660 10/1951 Price ............................ 192/0.084 X
2,580,107 12/1951 Long ................................. 192/0.07
2,587,892 3/1952 Price ................................ 192/0.073
2,601,628 6/1952 Price ..................................... 74/472
2,605,874 8/1952 Price ................................ 192/0.092
2,662,621 12/1953 Long ................................ 192/0.092
4,200,175 4/1980 Dick ............................. 192/0.092 X

FOREIGN PATENT DOCUMENTS 208235 3/1960 Austria ............................. 192/0.092
420146 4/1947 Italy ................................ 192/0.092

*Primary Examiner*—George H. Krizmanich
*Assistant Examiner*—Dirk Wright
*Attorney, Agent, or Firm*—C. H. Grace; P. S. Rulon

[57] ABSTRACT

A throttle modulation mechanism (10) disposed between a throttle pedal (28) and a fuel control device (12) varies speed and torque of an unshown engine. Mechanism (10) is operable during shifting modes of an unshown transmission driven by the engine to dip and boost fuel delivery to the engine for synchronizing the transmission and/or reducing shifting shocks. Mechanism (10), which is controlled by a transmission logic (14), includes first and second levers (16, 20) interconnected for slaved movement by a torsion spring and fluid actuated cylinders (38, 40) which respectively dip and boost the throttle in response to logic signals applied to solenoid valves (50, 64). A transducer (24), mechanically connected to first lever (16), provides an electrical signal representative of throttle pedal position. Torsion spring (22) includes ends (**22*b*, 22*c*) preloaded toward each other and clamping levers (16, 20 or 106**) into a predetermined relationship.

18 Claims, 6 Drawing Figures

FIG. 1.
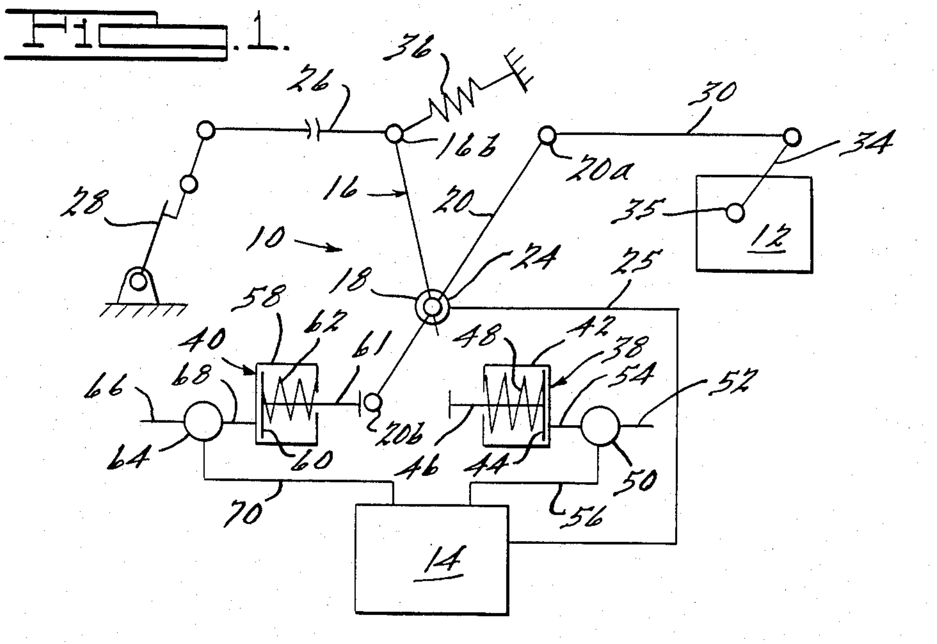
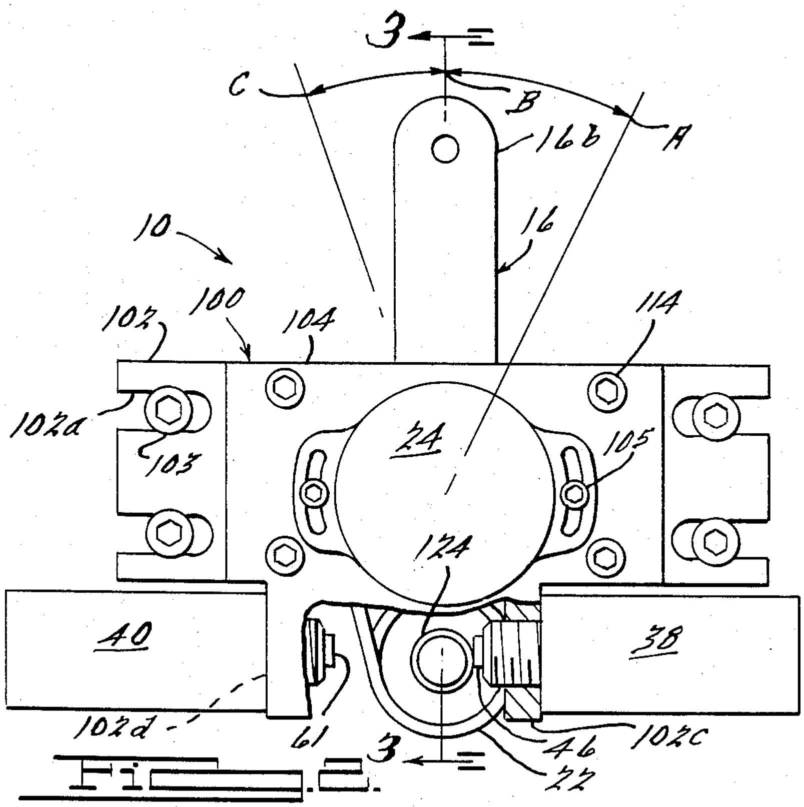
FIG. 2.

THROTTLE MODULATION MECHANISM

BACKGROUND OF THE INVENTION

1. Field of the Invention

The present invention relates to a mechanism for automatically modulating fuel delivery to an engine. More specifically, the present invention relates to such a mechanism for synchronizing and/or reducing shifting shocks of a transmission.

2. Description of the Prior Art

It has been previously proposed to automatically modulate or vary the speed of an engine during shifting modes of a transmission in an effort to simulate what is done by an experienced driver during manual shifting. For example, U.S. Pat. No. 3,736,806 proposes increasing fuel delivery to an engine during manual shifting of a mechanical transmission; U.S. Pat. No. 3,834,499 proposes both increasing and decreasing fuel delivery to an engine during automatic shifting of a mechanical transmission; and U.S. Pat. No. 4,226,141 proposes decreasing fuel delivery to an engine during automatic shifting of a transmission to facilitate synchronization of the transmission and to reduce shifting shocks.

The prior art mechanisms for modulating engine speed during shifting modes of a transmission have had several disadvantages. Most have been on/off type mechanisms which have not provided smooth, precise change in engine speed and torque and, therefore, have provided less than optimum synchronizing and shift shock results. Some have been incorporated directly into fuel control devices and therefore have required complex and costly redesign of the fuel control devices. Some have operated directly on throttle pedal linkages with resulting mechanical feedback o physical movement of the throttle pedal. This feedback or movement, which is noticed by the operator, is disagreeable and interferes with proper and effective control of the vehicle.

Further, with respect to optimum synchronizing and shift shock, the prior art mechanisms have not readily provided the many different precise degrees of fuel delivery change necessary during shifting modes of a transmission. For example, precisely regulated, ramped, incremental increases and decreases of fuel delivery can greatly reduce shifting shocks felt by a vehicle operator, reduce torsional oscillations in the vehicle drivetrain, reduce synchronizing time, reduce energy consumed by synchronizing devices, and reduce impulse forces on jaw clutches.

Further with respect to mechanical feedback or physical movement of the throttle pedal, even though a modulation mechanism may not physically move the throttle pedal during throttle modulation, the mechanism may cause objectionable force changes on the throttle pedal if the spring biasing the throttle system toward idle is not properly positioned and proportioned. These force changes, though not as disagreeable as physical movement of the throttle pedal, are nevertheless distracting to a vehicle operator.

SUMMARY OF THE INVENTION

An object of this invention is to provide a mechanism for controlling fuel delivery to a prime mover independent of throttle pedal position during shifting of a transmission driven by the prime mover.

Another object of this invention is to provide such a mechanism for controlling shifting shocks.

Another object of this invention is to provide such a mechanism for effecting synchronism in an automatic mechanical transmission.

According to a feature of the invention, the mechanism of the present invention is adapted to be interposed between an engine throttle pedal and an engine fuel control device such as throttle valve or a fuel injection device. The mechanism comprises first and second members mounted for relative movement and respectively adapted to be connected to the throttle pedal and the fuel control device for slaved movement therewith; resilient means clamping the members into a predetermined positional relationship with a preloaded, resilient force, the resilient means operative to maintain the predetermined relationship in response to movement of the throttle pedal during nonshifting modes of the transmission and operative to allow relative to-and-fro movement of the members from the predetermined relationship during shifting modes of the transmission clamping the members into a predetermined positional relationship with a preloaded, resilient force, the resilient means operative to maintain the predetermined relationship in response to movement of the throttle pedal during nonshifting modes of the transmission and operative to allow relative to-and-fro movement of the members from the predetermined relationship during shifting modes of the transmission; and means for moving the second member independent of the throttle pedal position during shifting modes of the transmission.

According to another feature of the invention, the mechanism, as adapted in the previous feature, includes first and second members mounted for pivotal movement about a common axis and respectively adapted to be connected to the throttle pedal and the fuel control device for slaved movement therewith; a torsion spring clamping the members into a predetermined positional relationship with a preloaded, resilient force, the resilient means operative to maintain the predetermined relationship in response to movement of the throttle pedal during nonshifting modes of the transmission and operative to allow relative to-and-fro movement of the members from the predetermined relationship during shifting modes of the transmission clamping the members into a predetermined positional relationship with a preloaded, resilient force, the resilient means operative to maintain the predetermined relationship in response to movement of the throttle pedal during nonshifting modes of the transmission and operative to allow relative to-and-fro movement of the members from the predetermined relationship during shifting modes of the transmission; and means for rotating the second member independent of the throttle pedal position during shifting modes of the transmission.

BRIEF DESCRIPTION OF THE DRAWINGS

The throttle modulation mechanism of the present invention is shown in the accompanying drawings in which:

FIG. 1 schematically illustrates the modulation mechanism connected between a throttle pedal and a fuel control device with the mechanism in the idle throttle position;

FIG. 2 is an elevational view of the mechanism of FIG. 1 in greater detail with a portion thereof broken away;

Figure 3:
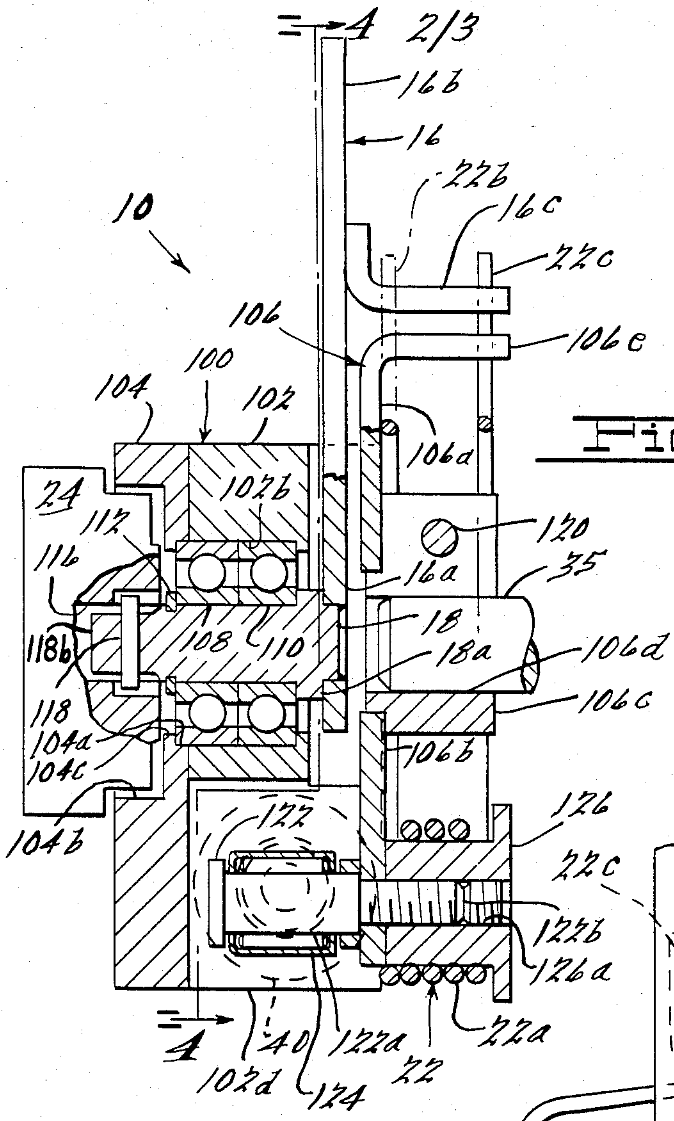
FIG. 3 is a somewhat enlarged partially sectioned view looking along line 3—3 of FIG. 2.

Certain terminology referring to proposed environment, direction, and motion will be used in the following description. This terminology is for convenience and clarity in describing the invention and should not be considered limiting in the appended claims unless the claims are explicitly so limited.

DETAILED DESCRIPTION OF THE DRAWINGS

FIG. 1 schematically shows a two-lever throttle modulation mechanism 10 for automatically decreasing and increasing fuel delivery from a fuel control device 12 to an unshown prime mover in response to signals from a transmission logic 14 during shifting modes of an unshown transmission driven by the prime mover. Mechanism 10 is contemplated for use in a wheeled vehicle such as a truck. The prime mover may be of any adaptable type, e.g. the prime mover may be an engine of the Otto or diesel cycle type. The transmission may also be of any multiple ratio type, e.g., a manually shifted transmission employing positive or jaw-type clutches to effect ratio changes, an automatically shifted transmission employing friction clutches to effect ratio changes, or an automatically shifted transmission employing positive clutches to effect ratio changes. Mechanism 10 is contemplated for use with this latter type of transmission, which is often referred to as an automatic mechanical transmission. Such a transmission and logic system for controlling shifting is disclosed in U.S. Pat. No. 4,361,060 which issued Nov. 30, 1982. U.S. Pat. No. 4,361,060 is incorporated herein by reference.

Mechanism 10 includes a first lever or member 16 fixed at one end 16*a* (see mechanism 100 of FIG. 3) to a shaft 18 mounted for rotation or oscillatory movement about its longitudinal axis, a second lever or member 20 mounted for rotation or oscillatory movement about the axis of shaft 18 and relative to the shaft and first lever 16, a torsion spring 22 (See FIGS. 2–6), and a transducer in the form of a potentiometer or pot 24 for providing an electrical signal representative of the position of first lever 16. The electrical signal is fed to logic 14 via a wire 25. First lever 16 is pivotally connected at its other end 16*b* to a linkage mechanism 26 moved in direct response to the position of an operator-controlled throttle pedal 28. Hence, pot 24 provides a signal representative of throttle pedal position. Second lever 20 is connected at its upper end to 20*a* the left end of a link 30 by a pivot connection. The lower end 20*b* of lever 20 is disposed between two actuators. The right end of link 30 is pivotally connected to a lever 34 which rotates a shaft 35 to vary fuel flow to the engine in response to rotation from the idle throttle position shown in FIG. 1 to the full or wide-open throttle position to be described hereinafter with respect to embodiment 100 in FIG. 2. First lever 16, link 26, and throttle pedal 28 are biased toward the idle throttle position by a spring 36. Second lever 20, link 30, and lever 34 are biased toward the idle throttle position by spring 36 via torsion spring 22 which is shown in FIGS. 2–6.

Mechanism 10 further includes throttle dip cylinder or actuator 38 to rotate second lever 20 clockwise independent of first lever 16 and a throttle boost cylinder or actuator 40 to rotate second lever 20 counterclockwise independent of first lever 16. Actuator 38 includes a cylinder housing 42, a piston 44, a piston rod 46 fixed to the piston, and a spring 48 biasing the piston to the right. Piston 44 is moved to the left by pressurized fluid controlled by an electrically operated valve 50. Valve 50 is connected to an unshown source of pressurized fluid, such as air, by a conduit 52 and to actuator 38 by a conduit 54. Valve 50 is electrically connected to logic 14 via a wire 56. Boost actuator 40 includes a cylinder housing 58, a piston 60, a piston rod 61 fixed to the piston, and a spring 62 biasing the piston to the left. A valve 64, substantially identical to valve 50, is connected to the source of pressurized fluid by a conduit 66 and to actuator 40 via a conduit 68. Valve 64 is electrically connected to logic 14 via a wire 70.

During nonshifting modes of the transmission, the pistons of the dip and boost cylinders remain in the positions shown in FIG. 1, whereby complete control of fuel delivery to the engine is a function of throttle pedal position due to the torsion spring interconnection of first and second levers 16 and 20. In FIG. 1, throttle pedal 28 and fuel control lever 34 are in the idle position with end 20*b* of lever 20 adjacent piston rod 61. As throttle pedal 28 is moved toward the wide-open throttle position, levers 16 and 20 freely rotate counterclockwise and at the wide-open throttle position end 20*b* is adjacent piston rod 46. During shifting modes of the transmission, as shown hereinafter, logic 14 energizes valves 50 and 64 in predetermined sequences to change the position of second lever 20 with respect to first lever 16 without actual movement of the throttle pedal due to the torsion spring connection between the first and second levers.

Valves 50, 64 may be of the nonpressure regulating type which either vent or apply full fluid pressure to the cylinder in response to the presence or absence of electrical signals from logic 14, whereby the cylinder pistons are either fully actuated or unactuated. Valves 50 and 64 are preferably of the pressure regulating type which control the pressure of the fluid to an from the cylinders, thereby controlling the piston position and rate of movement. Further, valves 50 and 60 may each be replaced by two or more valves controlled by the logic. Such valves and logics for controlling them are well-known, e.g., the valves may be responsive to amplitude modulated or duty-cycle modulated signals from the logic. One valve could be energized to vent its associated cylinder and the other to port fluid pressure to its associated cylinder.

Looking now at FIGS. 2–3 therein, the throttle modulation mechanism is shown in greater detail with components identical to components in FIG. 1 bearing the same numerals. The mechanism 10 includes a housing assembly 100 having a base member 102 with slotted opening 102*a* receiving screws 103 for securing the housing assembly on an unshown fuel control device and a plate member 104, the first lever 16 welded at its lower end 16*a* to shaft 18, a second lever 106 in lieu of the second lever 20 in FIG. 1, the torsion spring 22, throttle pedal position pot 24 secured to plate member 104 by screws 105 and actuators 38, 40 with piston rods 46, 61 protruding therefrom. Lever 16 is biased toward the idle throttle position by spring 36 as shown in FIG. 1.

Lever 16 is pivotally connectable at its upper end 16*b* to link 26 and is moveable in the embodiment of FIG. 1 and FIGS. 2–6 between idle throttle, wide-open throttle, and over-throttle positions A, B, and C, respectively. Movement between positions A and B varies fuel flow to the engine. Movement between positions B and C protects shaft 35 of fuel control device 12 when the throttle pedal is moved beyond the wide-open throttle position. Movement between positions B and C may be used to operate an unshown kickdown switch for the transmission. Base member 100 of the housing assembly 102 includes a stepped bore **102*b* housing two ball bearing 108, 110 assemblies disposed therein for rotatably supporting shaft 18 and two downwardly extending flanges 102*c*, 102*d* having threaded bores disposed along a common axis and receiving threaded ends 38*a*, 40*a* for rigidly securing actuator 38, 40 to the housing assembly. The right end of shaft 18 is welded to the lower end 16*b* of lever 16. Flange 102*d*, which is hidden in FIG. 2 by the unbroken away portion of plate member 104, is visable in FIG. 3. A stepped shoulder or flange 18*a* and a snap ring 112 prevent axial movement of shaft 18 in the bearings. Plate member 104 is secured to base member 102 by a plurality of screws 114 and includes a double stepped bore 104*a*, 104*b* defining a flange portion 104*c* therebetween. Bore 104*a* receives the outer race of bearing 108, flange portion retains the bearing against axial movement relative to the housing assembly, and bore 104*b* receives the back portion of pot 24. The back portion of pot 24 is open to receive an extension 18*b* of shaft 18 which drives a wiper 116 within via a pin 118**.

Lever 106 includes upper and lower arm portions **106*a*, 106*b* welded to a central hub 106*c* having an opening 106*d* for receiving a rotatable shaft such as shaft 35 from fuel control device 12. Unshown stops within fuel control device 12 limit rotation of shaft 35 between idle and wide-open throttle. Shaft 35 is secured in the opening by a screw 120. Housing assembly is aligned so that shafts 18 and 35 lie substantially along a common axis arm portion 106*b* of lever 106 includes a shoulder bolt 122 having an unthreaded portion 122*a* supporting a needle bearing 124 and a threaded portion 122*b* extending through an opening in the arm and threadably received by a bore 126*a* in a drum 126 supporting coils 22*a* of the torsion spring 22. Upper arm portion 106*a* includes a right angle tab portion 106*e* disposed radially inward from a right angle tab 16*c* welded to lever 16. Levers 16 and 106 are resiliently clamped into a predetermined positional relationship by torsion spring arms 22*b* and 22*c*. The arms are preloaded toward each other with a force suffice to maintain the positional relationship in response to movement of arm 16 by throttle pedal 28 during nonshifting modes of the unshown transmission. Further, the preload force is preferably sufficiently less than the force of spring 36 in FIG. 1 so that movement lever of 106 by actuators 38, 40** during a shifting mode of the transmission is relatively unnoticeable by a vehicle operator having his foot on the throttle pedal.

Figure 4:
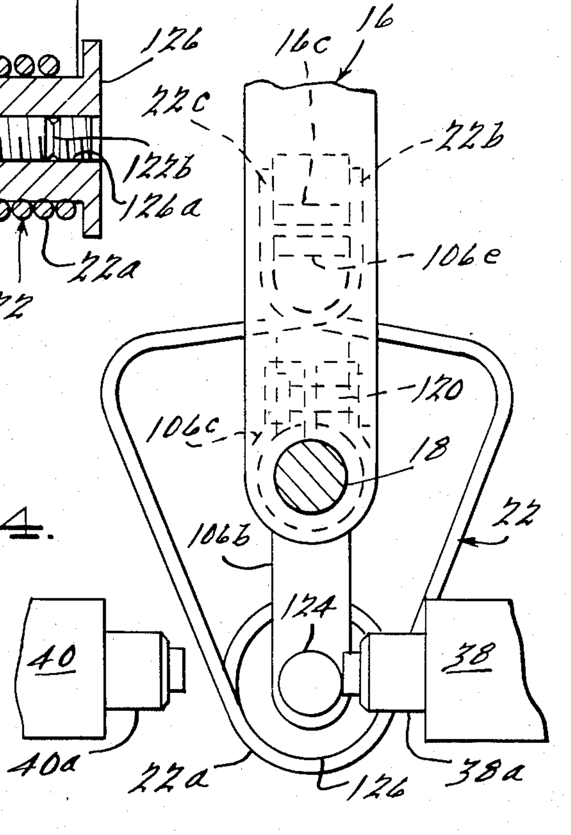
FIGS. 4–6 illustrate three different positions of a portion of the mechanism looking along line 4—4 of FIG. 3.
Figure 5:
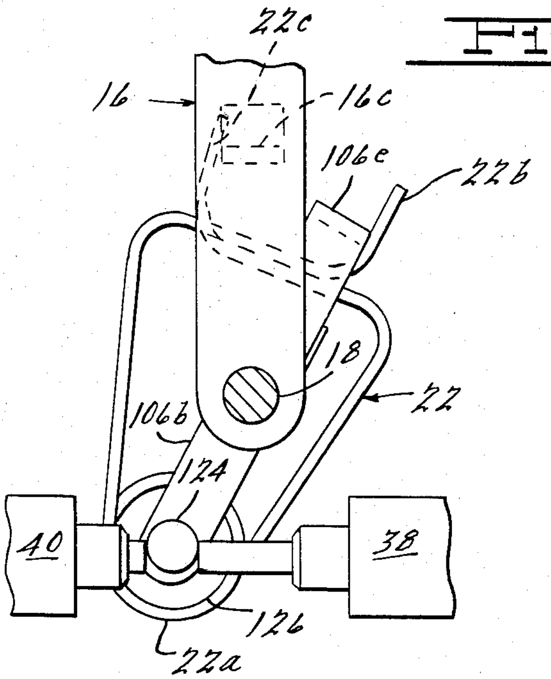
Figure 6:
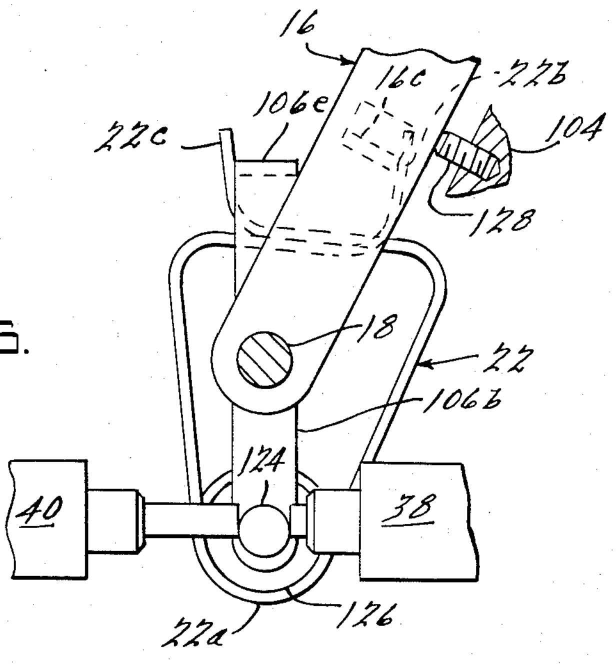

FIGS. 2–4 show levers 16 and 106 in the wide-open throttle position with actuators 38, 40 in their unactuated positions. FIG. 5 shows lever 16 in the wide-open throttle position with lever 106 moved to the idle or throttle dip position by dip actuator 38. FIG. 6 shows lever 16 in the idle throttle position with lever 106 moved to the wide-open or throttle boost position by boost actuator 40.

A stop 128, supported by a partially shown portion of base member 104, limits or sets the position of lever 16 when the throttle pedal is in the idle throttle position. When the throttle pedal is in the idle throttle position and the boost actuator or both actuators are in the unactuated positions, the unshown stops within fuel control device 12 set the position of lever 106 at the position shown in FIG. 5 and the stop 128 sets the position of lever 16 at the position shown in FIG. 6. When the levers are in these two positions, lever 16 is a degree or two clockwise beyond lever 106, whereby initial movement of the throttle pedal and lever 16 from the idle throttle pedal position will not move lever 106 and shaft 35. This dead or lost motion band between the levers actuates an unshown switch which provides an electrical signal informing logic 14 that the vehicle operator's foot is on the throttle pedal.

Operation

To describe operation, it will be assumed that mechanism 10 is in a wheeled vehicle in combination with an automatic mechanical transmission having jaw-type clutches for engaging and disengaging step ratio gears in the transmission and a friction type master clutch interposed between the prime mover and the transmission. The jaw and master clutches are controlled by logic 14. Further, logic 14 maintains the master clutch disengaged when the vehicle is at rest and the unshown switch actuated by lever 16 indicates that the vehicle operator's foot is off the throttle pedal. The unshown switch may be incorporated in pot 24 in a well-known manner with an electrical signal therefrom supplied to logic 14 by wire 25. The transmission may further include devices to assist synchronization of the jaw clutches, e.g., the jaw clutches may each include a synchronizer which effects upshift and downshift synchronization or, retarder and accelerator devices which respectively effect upshift and downshift synchronizing of all of the ratios. The retarder may be a brake connected to the transmission input shaft, and the accelerator may be a clutch operative to connect the input shaft with a faster rotating member. Such retarder and accelerator devices are well-known in the art and are readily made responsive to signals from a logic. Further, size, wear, and effectiveness of all of these devices is enhanced by mechanism 10 since the amount of torque they would often have be handled is decreased by throttle modulation.

Assuming now that the transmission shift selector is in a forward drive position with the throttle pedal in the idle position and the vehicle at rest, the master clutch is therefore disengaged, and a starting ratio gear is engaged. When the throttle pedal is depressed, the master clutch is engaged at a rate determined by throttle pedal position and other known parameters. When the vehicle reaches a speed, determined by throttle position and other parameters, logic 14 initiates an upshift mode; at this time the throttle pedal may be at any position between idle and up to an including wide-open throttle as shown in FIG. 3. The upshift mode may comprise several different sequences to effect the upshift. Herein is one sequence: logic 14 sends a throttle dip signal to valve 50 via wire 56 to dip the throttle or decrease fuel delivery to the engine, thereby reducing engine torque in the vehicle drivetrain and suspension system at a controlled rate prior to disengagement of the master clutch. Concurrent or substantially concurrent with the throttle dip signal, logic 14 initiates disengagement of the then-engaged jaw clutch, which will not normally move to the disengaged position until the driveline torque across the jaws diminishes. The logic then initiates disengagement of the master clutch if the transmission includes a retarder, such as a brake, to reduce input shaft speed for synchronizing the jaw clutch to be engaged for the next upshift ratio. As synchronization is reached, the logic initiates reengagement of the jaw clutch and then engagement of the master clutch at a controlled rate, and then throttle boost by venting actuator 38 and/or pressurizing actuator 40 to control the rate of engine speed and torque rise commensurate with a smooth shift. Further upshifts are substantially the same.

Downshifts differ principally in that they require an increase in input shaft speed to effect synchronization. When logic 14 senses the need for a downshift, a throttle dip signal is sent to valve 50 via wire 56 as during an upshift. Concurrent or substantially concurrent with the throttle dip signal, logic 14 initiates disengagement of the then-engaged jaw clutch which will not normally move to the disengaged position until the driveline torque across the jaws diminishes. The logic then initiates disengagement of the master clutch. If the transmission includes an accelerator device, as previously mentioned, the device increases the input shaft speed to synchronize the jaw clutch to be engaged while the master clutch remains disengaged; as synchronization is reached, the logic initiates engagement of the jaw clutch and then engagement of the master clutch. If the transmission does not include such a device, logic 14 initates engagement of the master clutch and then throttle boost to effect synchronization by sending a boost signal to valve 64 via wire 70, then disengagement of the master clutch as synchronization is reached and engagement of the jaw clutch, and then reengagement of the master clutch at a controlled rate. This engagement, disengagement, and reengagement of the master clutch during the downshift sequence is the well-known double clutch procedure long practiced by operators of manually shifted transmissions.

One embodiment of the invention has been disclosed for illustrative purposes. Many variations and modifications of the disclosed embodiment are believed to be within the spirit of the invention. The following claims are intended to cover the inventive portions of the invention and variations and modifications within the spirit of the disclosed invention.

What is claimed is:

1. A mechanism adapted to be interposed between an engine throttle pedal and an engine fuel control device for varying fuel delivery to an engine during shifting modes of a transmission driven by the engine, the mechanism comprising:

- a first member mounted for pivotal movement about an axis and adapted for slaved movement with the throttle pedal;
- a second member mounted for pivotal movement relative to said first member, substantially about said axis, and adapted to be connected with the fuel control device for slaved movement therewith;
- actuator means operative when actuated to move said second member independent of the first member to vary the fuel delivery; and
- resilient means clamping said members into a predetermined positional relationship with a preloaded, resilient force operative to maintain said predetermined relationship during throttle pedal movement while said actuator means is unactuated and operative to allow said relative movement independent of throttle pedal position in response to actuation of said actuator means.

2. The mechanism of claim 1, further including transducer means driven by said first member for producing a signal representative of the position of said first member.

3. The mechanism of claim 1, wherein said resilient means comprises a torsion spring having its arms preloaded toward each other and embracing opposite sides of portions of said members.

4. The mechanism of claim 1, wherein said first member is fixed to a shaft supported by bearing means and further including a transducer responsive to rotation of said shaft for producing a signal representative of the position of said first member.

5. The mechanism of claim 1, wherein said first member is moveable between idle throttle, wide-open throttle, and over-throttle positions, said actuator means operative in an unactuated position to allow free movement of said second member between corresponding idle throttle and wide-open throttle positions by said resilient means for varying the fuel delivery, and resilient said means allowing movement of said first member between said wide-open throttle and over-throttle positions without corresponding movement of said second member.

6. The mechanism of claim 1, wherein said second member includes a portion radially spaced from said common axis, and said actuator means includes a throttle dip actuator and a throttle boost actuator disposed on opposite sides of said radially spaced portions and selectively operative contact to said radially spaced portion for moving said second member in opposite directions to decrease and increase said fuel delivery.

7. The mechanism of claim 6, wherein said actuators are fluid pressure responsive.

8. In a vehicle having ground-engaging wheels driven by a multiple, step ratio transmission connected to a combustion engine; an operator-controlled throttle pedal for varying fuel delivery to the engine by a fuel control device; and an improved mechanism for varying the fuel delivery independent of the throttle pedal position; the improvement comprising:

- a first member slaved for pivotal movement about an axis in response to movement of the throttle pedal;
- a second member mounted for pivotal movement relative to said first member, substantially about said axis, and connected with the fuel control device for slaved movement therewith;
- actuator means operative when actuated to move said second member independent of the first member to vary the fuel delivery; and
- resilient means clamping said members into a predetermined positional relationship with a preloaded, resilient force operative to maintain said predetermined relationship during throttle pedal movement while said actuator means is unactuated and operative to allow said relative movement independent of throttle pedal position in response to actuation of said actuator means.

9. The mechanism of claim 8, further including transducer means driven by said first member for producing a signal representative of the position of said first member.

10. The mechanism of claim 8, wherein said resilient means comprises a torsion spring having its arms preloaded toward each other and embracing opposite sides of portions of said members.

11. The mechanism of claim 8, wherein said first member is fixed to a shaft supported by bearing means and further including a transducer responsive to rotation of said shaft for producing a signal representative of the position of said first member.

12. The mechanism of claim 8 wherein said first member is moveable between idle throttle, wide-open throttle, and over-throttle positions, said actuator means operative in an unactuated position to allow free movement of said second member between corresponding idle throttle and wide-open throttle positions by said resilient means for varying the fuel delivery, and resilient said means allowing movement of said first member between said wide-open throttle and over-throttle positions without corresponding movement of said second member.

13. The mechanism of claim 8, wherein said second member includes a portion radially spaced from said common axis, and said actuator means includes a throttle dip actuator and a throttle boost actuator disposed on opposite sides of said radially spaced portions and selectively to said radially spaced portion for moving said second member in opposite directions to decrease and increase said fuel delivery.

14. The mechanism of claim 13, wherein said actuators are fluid pressure responsive.

15. A mechanism adapted to be interposed between an engine throttle pedal and an engine fuel control device for varying fuel delivery to an engine during shifting modes of a transmission driven by the engine, the mechanism comprising:

a first member mounted for movement and adapted for slaved movement with the throttle pedal;

a second member mounted for movement relative to said first member and adapted to be connected with the fuel control device for slaved movement therewith;

actuator means operative when actuated to move said second member independent of the first member to vary the fuel delivery;

resilient means clamping said members into a predetermined positional relationship with a preloaded, resilient force operative to maintain said predetermined relationship during throttle pedal movement while said actuator means is inactuated and operative to allow said relative movement independent of throttle pedal position in response to actuation of said actuator means; and transducer means driven by said first member for producing a signal representative of the position of said first member.

16. The mechanism of claim 15, wherein said first member is fixed to a shaft supported by bearing means and said shaft drives said transducer means.

17. In a vehicle having ground-engaging wheels driven by a multiple, step ratio transmission connected to a combustion engine; an operator-controlled throttle pedal for varying fuel delivery to the engine by a fuel control device; and an improved mechanism for varying the fuel delivery independent of the throttle pedal position; the improvement comprising:

a first member slaved for movement with the throttle pedal;

a second member mounted for movement relative to said first member and connected with the fuel control device for slaved movement therewith;

actuator means operative when actuated to move said second member independent of the first member to vary the fuel delivery;

resilient means clamping said members into a predetermined poitional relationship with a preloaded, resilient force operative to maintain said predetermined relationship during throttle pedal movement while said actuator means is unactuated and operative to allow said relative movement independent of throttle pedal position in response to actuation of said actuator means; and including transducer means driven by said first member for producing a signal representative of the position of said first member.

18. The mechanism of claim 17, wherein said first member is fixed to a shaft supported by bearing means and said shaft drives said transducer means.

* * * * *